US011940216B1

(12) United States Patent
Feng et al.

(10) Patent No.: US 11,940,216 B1
(45) Date of Patent: Mar. 26, 2024

(54) HIGH-TEMPERATURE FLUE GAS RECOVERY APPARATUS FOR MELTING FURNACE

(71) Applicant: ZHEJIANG HAILIANG CO., LTD., Zhejiang (CN)

(72) Inventors: Huanfeng Feng, Shaoxing (CN); Gangfeng Sun, Shaoxing (CN); Zhongzhan Zhang, Shaoxing (CN)

(73) Assignee: ZHEJIANG HAILIANG CO., LTD., Shaoxing (CN)

( * ) Notice: Subject to any disclaimer, the term of this patent is extended or adjusted under 35 U.S.C. 154(b) by 0 days.

(21) Appl. No.: 18/242,752

(22) Filed: Sep. 6, 2023

(30) Foreign Application Priority Data

Aug. 17, 2023 (WO) ................ PCT/CN2023/113546

(51) Int. Cl.
*F27D 3/18* (2006.01)
*F27B 3/18* (2006.01)
(Continued)

(52) U.S. Cl.
CPC .............. *F27B 3/18* (2013.01); *F27D 3/0031* (2013.01); *F27D 13/00* (2013.01); *F27D 17/002* (2013.01);
(Continued)

(58) Field of Classification Search
CPC .......... F27B 3/18; F27D 3/0031; F27D 13/00; F27D 17/002; F27D 17/004;
(Continued)

(56) References Cited

U.S. PATENT DOCUMENTS 4,691,900 A * 9/1987 Maeda .................... F27B 1/025 266/175
4,852,858 A * 8/1989 Weber ..................... C21C 5/565 266/175

(Continued)

*Primary Examiner* — Scott R Kastler
*Assistant Examiner* — Michael Aboagye
(74) *Attorney, Agent, or Firm* — Oliff PLC

(57) ABSTRACT

Disclosed is a high-temperature flue gas recovery apparatus for a melting furnace, which relates to copper production, including a preheating chamber and a feeding mechanism, a lower end of the preheating chamber being in communication with a feeding port of the melting furnace, the feeding mechanism being disposed above the preheating chamber to deliver feedstock into the preheating chamber, a plurality of layers of buffer mechanisms layered in an upper-lower manner being provided in the preheating chamber, each layer of the buffer mechanism including a buffer element and a drive element, the drive element driving the corresponding buffer element to move such that the feedstock on the buffer element of an upper-layer buffer mechanism falls onto the buffer element of a lower-layer buffer mechanism, a gap allowing a gas to pass through being provided between the buffer mechanisms and an inner wall of the preheating chamber. The solution may recover the high-temperature flue gas produced by the melting furnace to preheat the feedstock, thereby enhancing the energy utilization ratio during the production process; moreover, with the plurality of buffer mechanisms, the solution may charge the feedstock into the melting furnace in small quantity per time and in multiple times, facilitating accurate control of the feeding rate and amount of the feedstock.

11 Claims, 13 Drawing Sheets

(51) Int. Cl.
*F27D 3/00* (2006.01)
*F27D 13/00* (2006.01)
*F27D 17/00* (2006.01)

(52) U.S. Cl.
CPC .... *F27D 17/004* (2013.01); *F27D 2003/0034* (2013.01)

(58) Field of Classification Search
CPC ............ C21C 2100/00; C21C 2100/02; C21C 2100/04; C21C 2100/06; C21C 5/562; C21C 5/28
USPC ........ 266/258, 142, 200, 900, 901, 175, 156
See application file for complete search history.

(56) References Cited

U.S. PATENT DOCUMENTS 4,881,972 A * 11/1989 Weber ................... C21C 7/0025 266/901
6,024,912 A * 2/2000 Wunsche .................. F27D 3/04 373/80
6,241,798 B1 * 6/2001 Dimitrov .............. C21C 5/5252 75/10.63
6,696,013 B2 * 2/2004 Wunsche ................ C21B 11/08 266/200

* cited by examiner

Fig,2

HIGH-TEMPERATURE FLUE GAS RECOVERY APPARATUS FOR MELTING FURNACE

FIELD

The subject matter described herein relates to copper production, and more particularly relates to a high-temperature flue gas recovery apparatus for a melting furnace.

BACKGROUND

In conventional prime metal melting process for producing copper and copper alloy tubes, sheets, and strips, a large amount of flue gas would be generated in a high-temperature melting furnace. In existing equipment, the high-temperature flue gas is generally directly discharged out of the high-temperature melting furnace and exhausted after waste gas treatment; this conventional practice causes direct waste of the heat in the flue gas and incurs energy loss.

SUMMARY

To overcome the drawbacks such as waste of energy in high-temperature flue gas in conventional technologies where the high-temperature flue gas in a high-temperature melting furnace is directly discharged after waste gas treatment, embodiments of the disclosure provide a high-temperature flue gas recovery apparatus, which may preheat feedstock using the high-temperature flue gas produced when the feedstock is melted in a melting furnace, thereby enhancing energy utilization ratio in the production process.

To achieve the above object, embodiments of the disclosure provide a technical solution below:

A high-temperature flue gas recovery apparatus for a melting furnace, comprising: a preheating chamber and a feeding mechanism, a lower end of the preheating chamber being in communication with a feeding port of the melting furnace, the feeding mechanism being disposed above the preheating chamber to deliver feedstock into the preheating chamber, a plurality of layers of buffer mechanisms layered in an upper-lower manner being provided in the preheating chamber, each layer of the buffer mechanism comprising a buffer element and a drive element, the drive element driving the corresponding buffer element to move such that the feedstock on the buffer element of an upper-layer buffer mechanism falls onto the buffer element of a lower-layer buffer mechanism, a gap allowing a gas to pass through being provided between the buffer mechanisms and an inner wall of the preheating chamber.

In the technical solution above, since the melting furnace constantly generates high-temperature flue gas during the production process, the communication between a lower end of the preheating chamber and the feeding port of the melting furnace allows the high-temperature flue gas in the melting furnace to access the preheating chamber; the high-temperature gas accessing the preheating chamber may pass through respective layers of the buffer mechanisms from down to top via the gaps to heat the feedstock on respective layers of the buffer mechanisms; arrangement of a plurality of layers of buffer mechanisms in the preheating chamber may increase the stay time of the feedstock in the preheating chamber such that the feedstock may be sufficiently heated by the high-temperature flue gas, which increases the waste heat recovery rate and thus increases energy utilization ratio of the production process; in addition, with the plurality of layers of buffer mechanisms, the present solution allows to feed the feedstock to the melting furnace in small quantity per time and in multiple times, which facilitates accurate control of the feed rate and amount of the feedstock. Meanwhile, preheating of the feedstock may effectively enhance the melting speed of the feedstock charged, reduce energy consumption of the melting furnace, and save production costs.

Preferably, the buffer element has a buffer state and a discharge state, the drive element driving the buffer element to switch between the buffer state and the discharge state.

Preferably, one end of the buffer element is hinged to the preheating chamber, and the other end of the buffer element is dangling; in a case where the buffer element is in the buffer state, the buffer element is horizontally disposed; in a case where the buffer element is in the discharge state, the buffer element is inclinedly disposed.

In the technical solution above, the buffer element is of a plate structure. When the buffer element is in the buffer state, the feedstock may be stacked above the buffer element; when the buffer element is in the discharge state, the feedstock above the buffer element may slide down onto the lower buffer element along the inclinedly disposed buffer element.

Preferably, each layer of the buffer mechanism comprises two buffer elements and two drive elements, each drive element driving the corresponding buffer element, the two buffer elements being oppositely disposed.

In the technical solution above, separate provision of the two buffer elements allows their separate control, such that the feedstock on each layer may further be fed in twice; in this way, the feeding rate and amount of the feedstock may be controlled more accurately.

Preferably, the drive element is a vibrator, the buffer element being inclinedly disposed; in two neighboring buffer elements, a lower end of the upper buffer element is aligned to a higher end of the lower buffer element such that when the vibrator drives the upper buffer element to vibrate, the feedstock on the upper buffer element falls onto the lower buffer element; and the buffer element is connected to the preheating chamber via an elastic member.

In the technical solution above, the buffer element is brought to vibrate by the vibrator such that the feedstock on the buffer element moves slowly downward; the feedstock may be spread on the buffer element and fall onto the lower-layer buffer element, finally falling into the melting furnace; and the elastic member may ensure that the buffer element has an enough vibration amplitude.

Preferably, an inner cavity of the feeding mechanism is in communication with an inner cavity of the preheating chamber, allowing the gas in the preheating chamber to access the inner cavity of the feeding mechanism to perform first preheating to the feedstock in the feeding mechanism, and allowing the feedstock in the feeding mechanism to access the preheating chamber such that the gas in the preheating chamber performs secondary preheating to the feedstock.

In the technical solution above, the high-temperature gas may perform first preheating and secondary preheating to the feedstock in the feeding mechanism and the preheating chamber, respectively, which may increase the duration of heat exchange and give a better preheating effect, thereby sufficiently utilizing heat energy of the high-temperature flue gas.

Preferably, the feeding mechanism comprises a rotary cylinder and a gas cylinder, the gas cylinder being sleeved outside the rotary cylinder, a screw pusher plate being provided on an inner wall of the rotary cylinder, one end of the rotary cylinder being provided with a feedstock inlet port, the other end of the rotary cylinder being provided with a feedstock outlet port, one end of the gas cylinder being provided with a gas inlet, the other end of the gas cylinder being provided with a gas outlet, the gas inlet being in communication with the preheating chamber, the feedstock outlet port being disposed above the buffer element, and the gas outlet being in communication with an external extraction device.

In the technical solution above, the feedstock enters the rotary cylinder via the feedstock inlet port; under the action of the screw pusher plate, the feedstock is delivered towards the feedstock outlet port; the high-temperature flue gas in the preheating chamber enters the gas cylinder via the gas inlet to heat the inner wall of the gas cylinder; the gas cylinder transfers heat to the rotary cylinder so as to heat the feedstock in the rotary cylinder; the cooled flue gas is discharged out of the gas cylinder via the gas outlet; and the feedstock in the rotary cylinder, after being heated, enters the preheating chamber via the feedstock outlet port, where it is further heated.

Preferably, the feeding mechanism comprises a rotary cylinder, a screw pusher plate being provided on an inner wall of the rotary cylinder, one end of the rotary cylinder being provided with a feedstock inlet port and a gas outlet, the other end of the rotary cylinder being provided with a feedstock outlet port, the feedstock outlet port being disposed above the buffer element, and the gas outlet being in communication with an external extraction device.

In the technical solution above, the feedstock enters the rotary cylinder via the feedstock inlet port, and under the action of the screw pusher plate, the feedstock moves towards the feedstock outlet port; the high-temperature flue gas in the preheating chamber may enter the rotary cylinder via the feedstock outlet port to heat the feedstock in the rotary cylinder; the cooled flue gas is discharged out of the rotary cylinder via the gas outlet; and the feedstock in the rotary cylinder, after being heated by the high-temperature flue gas, enters the preheating chamber via the feedstock outlet port, where it is further heated. In this solution, the high-temperature flue gas directly contacts with the feedstock in the rotary cylinder, which offers a better heat exchange effect.

Preferably, the feeding mechanism comprises a feed cylinder and a gas cylinder, the gas cylinder being sleeved outside the feed cylinder, a feeding shaft being provided in the feed cylinder, a screw pusher plate being provided on a sidewall of the feeding shaft, one end of the feed cylinder being provided with a feedstock inlet port, the other end of the feed cylinder being provided with a feedstock outlet port, one end of the gas cylinder being provided with a gas inlet, the other end of the gas cylinder being provided with a gas outlet, the gas inlet being in communication with the preheating chamber, the feedstock outlet port being disposed above the buffer element, and the gas outlet being in communication with an external extraction device.

In the technical solution above, the feedstock enters the feed cylinder via the feedstock inlet port; the feeding shaft drives the screw pusher plate to rotate; under the action of the screw pusher plate, the feedstock moves towards the feedstock outlet port; the high-temperature flue gas in the preheating chamber enters the gas cylinder via the gas inlet to heat the inner wall of the gas cylinder; the gas cylinder transfers heat to the feed cylinder to heat the feedstock in the feed cylinder; the cooled flue gas is discharged out of the gas cylinder via the gas outlet; and the feedstock in the feed cylinder, after being heated, enters the preheating chamber via the feedstock outlet port, where it is further heated. In this solution, the feed cylinder and the gas cylinder do not rotate relative to each other, such that a sealing structure is more easily arranged, and a better sealing effect is achieved; and accordingly, the high-temperature flue gas does not easily escape from a joint between the feed cylinder and the gas cylinder.

Preferably, the feeding mechanism comprises a flue-gas collection hood, a transverse movement assembly, and a pusher assembly disposed above the transverse movement assembly, a lower end of the flue-gas collection hood being in communication with the preheating chamber, an exhaust pipe being provided on the flue-gas collection hood, the transverse movement assembly being transversely movable relative to the flue-gas collection hood, one end of the transverse movement assembly extending into the flue-gas collection hood, the pusher assembly comprising a lift drive and a lift plate, the lift drive being mounted on the preheating chamber, and the lift drive driving the lift plate to lift.

In the technical solution above, the transverse movement assembly delivers the feedstock outside the flue-gas collection hood into the flue-gas collection hood, and then the lift drive in the pusher assembly drives the lift plate to move downward such that the lift plate blocks the feedstock on the transverse movement assembly; afterwards, the transverse movement assembly moves backward such that the feedstock on the transverse movement assembly is blocked by the lift plate and falls into the preheating chamber below the flue-gas collection hood.

Preferably, a rotary shaft is fixed at a position where the buffer element is hinged to the preheating chamber, the rotary shaft extending out of the preheating chamber and being fixed with a connecting element; the drive element comprises a rotary drive and a drive shaft which are mounted on the preheating chamber, the rotary drive driving the drive shaft to rotate; a plurality of annular grooves arranged at intervals along a vertical direction are provided on a sidewall of the drive shaft, each of the annular grooves comprising a horizontal segment and a crooked segment which are in communication with each other, the crooked segments of two upper-lower neighboring annular grooves being misaligned; one end of the connecting element extends into the corresponding annular groove and is slidingly disposed relative to the annular groove; when one end of the connecting element is located at the horizontal segment, the buffer element is disposed in the buffer state, and when the end of the connecting element is located at the crooked segment, the buffer element is disposed in the discharge state; and positions of a plurality of connecting elements connected to a same drive shaft are located on a same vertical line.

In the technical solution above, the drive shaft is fixed to the preheating chamber in the axial direction of the drive shaft, such that the drive shaft can only rotate relative to the preheating chamber, the drive shaft being driven to rotate by the rotary drive; during the rotating process of the drive shaft, the annular groove rotates along therewith, and since one end of the connecting element extends into the annular groove and is slidingly disposed relative to the annular groove, the end of the connecting element extending into the annular groove switches between the horizontal segment and the crooked segment; when the end of the connecting element extending into the annular groove is located at the horizontal segment, the buffer element is in the buffer state; and when the end of the connecting element enters the crooked segment from the horizontal segment, the connecting element moves a certain distance vertically, bringing the buffer element to rotate by a certain angle about the rotary shaft, whereby the buffer element switches from the buffer state to the discharge state; with continuous rotation of the drive shaft, the end of the connecting element further enters the horizontal segment from the crooked segment, whereby the buffer element switches back to the buffer state from the discharge state. Since the crooked segments of the two neighboring annular grooves are misaligned, in the two neighboring annular grooves, when one end of one connecting element thereof is disposed at the crooked segment, one end of the other connecting element is surely disposed at the horizontal segment; in this way, the two buffer elements may be disposed in two different states at the same time, which may avoid a circumstance that the upper and lower buffer elements are simultaneously disposed in the discharge state and the feedstock directly crosses over a plurality of buffer mechanisms without staying, thereby ensuring that the feedstock has a sufficient time to be preheated. Moreover, in the solution above, the plurality of buffer elements may be controlled only via one rotary drive and one drive shaft, which may save costs of the drive elements; meanwhile, after the apparatus is completely assembled, respective buffer elements may switch between the buffer state and the discharge state according to a preset time sequence only by driving the drive shaft to rotate continuously, without a need to set a complex control program as well as control elements, resulting in a lower control cost and a more reliable control. In a case where the feedstock is fully stacked on the connecting element and one end of the connecting element is disposed at the horizontal segment, the acting force direction of the connecting element against the drive shaft is identical to the axial direction of the drive shaft, such that the drive shaft is subjected to no acting force in the horizontal direction, whereby rotation of the drive shaft is almost unaffected; therefore, the rotary drive may adopt a smaller torque, which reduces the cost of the rotary drive; when the rotary drive stops rotation, the connecting element is locked, such that the buffer element is maintained in the buffer state or the discharge state, offering a higher stability for the buffer element to switch between states; meanwhile, it eliminates an extra locking mechanism, further reducing the costs of parts.

Preferably, in the plurality of annular grooves, any two crooked segments are misaligned. This technical solution may ensure that only one buffer element is in a discharge state at the same time.

Preferably, when the drive shaft is rotating, in any two connecting elements, the lower connecting element passes through the crooked segment earlier than the upper connecting element; or, when the drive shaft is rotating, the upper connecting element passes through the crooked segment earlier than the lower connecting element. In the technical solution, when the drive shaft is rotating, the respective buffer elements may switch from the buffer state to the discharge state sequentially from down to top or from top to down.

Preferably, a contact shaft is provided on the connecting element, the contact shaft being rotatably connected to the connecting element, one end of the contact shaft extending into the annular groove, the connecting element being connected to the annular groove via the contact shaft. The contact shaft may convert the sliding friction between the connecting element and the sidewall of the annular groove into rolling friction.

Preferably, each layer of buffer mechanism comprises two buffer elements, the two buffer elements in a same layer of buffer mechanism being oppositely disposed, end portions of the two connecting elements in the same layer of buffer mechanism being disposed in a same annular groove, the two connecting elements being disposed at opposite sides of the drive shaft such that the two buffer elements in the same layer of buffer mechanism are in a discharge state and a buffer state, respectively, and at most one of all buffer elements is in the discharge state at the same time.

Figure 1:
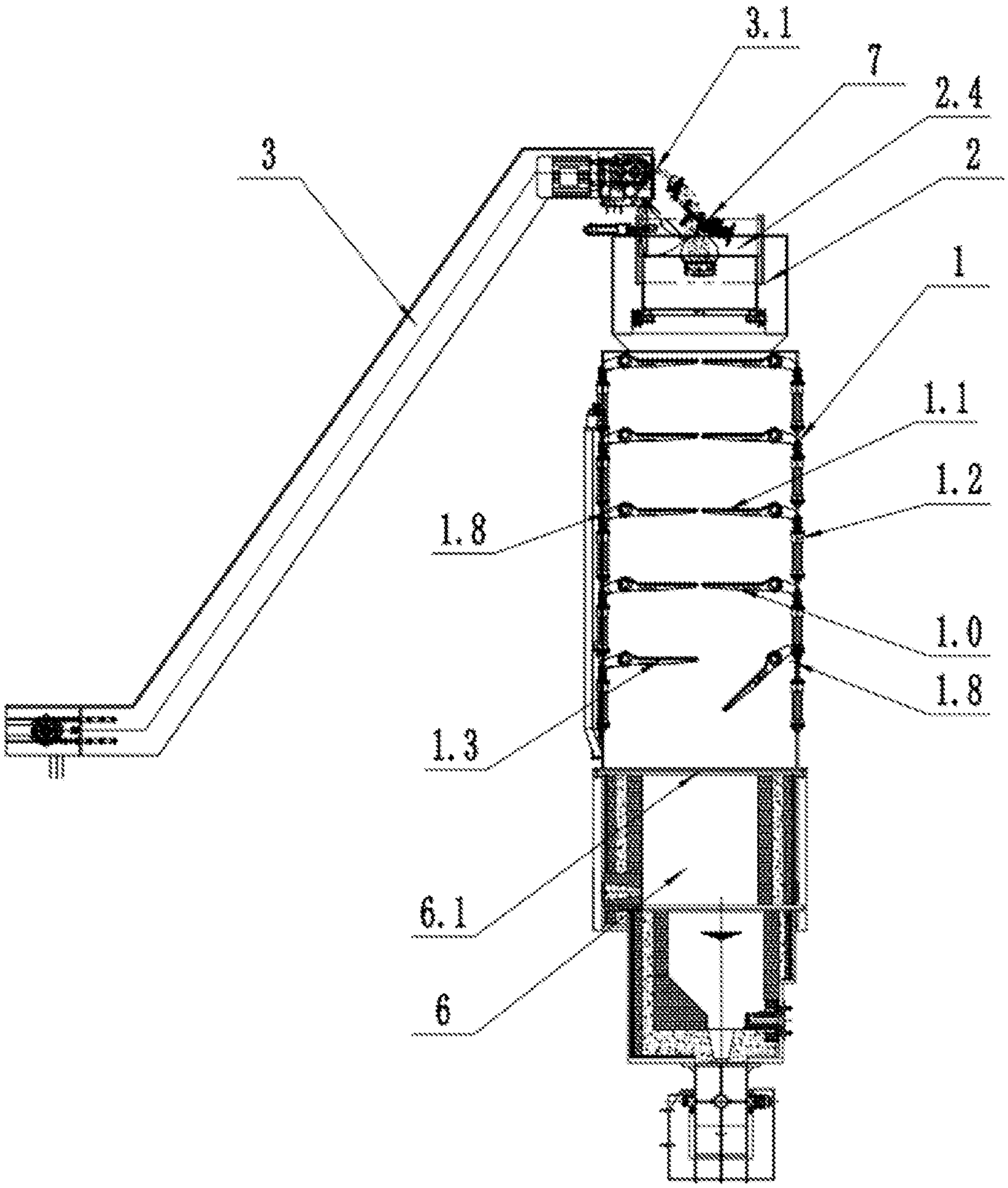
FIG. 1 is a first structural schematic diagram of the disclosure.

Reference Numerals: preheating chamber 1; buffer mechanism 1.0; buffer element 1.1; drive element 1.2; through hole 1.3; rotary shaft 1.4; connecting element 1.5; elastic member 1.6; contact shaft 1.7; gap 1.8; gas fuel nozzle 1.9; feeding mechanism 2; rotary cylinder 2.1; gas cylinder 2.2; screw pusher plate 2.3, feedstock inlet port 2.4; feedstock outlet port 2.5; gas inlet 2.6; gas outlet 2.7; feed cylinder 2.8; flue-gas collection hood 2.9; transverse movement assembly 2.10; pusher assembly 2.11; lift drive 2.11.1; lift plate 2.11.2; exhaust pipe 2.12; feeding shaft 2.13; lifting chain scrapper conveyor 3; delivery port 3.1, spreading linear drive 4.1; spreading plate 4.2, drive shaft 5; annular groove 5.1; horizontal segment 5.1.1; crooked segment 5.1.2; melting furnace 6; feeding port 6.1; feedstock 7; rotary drive 8.

DETAILED DESCRIPTION

Hereinafter, the disclosure will be described in further detail through embodiments with reference to the accompanying drawings.

Embodiment 1

Figure 2:
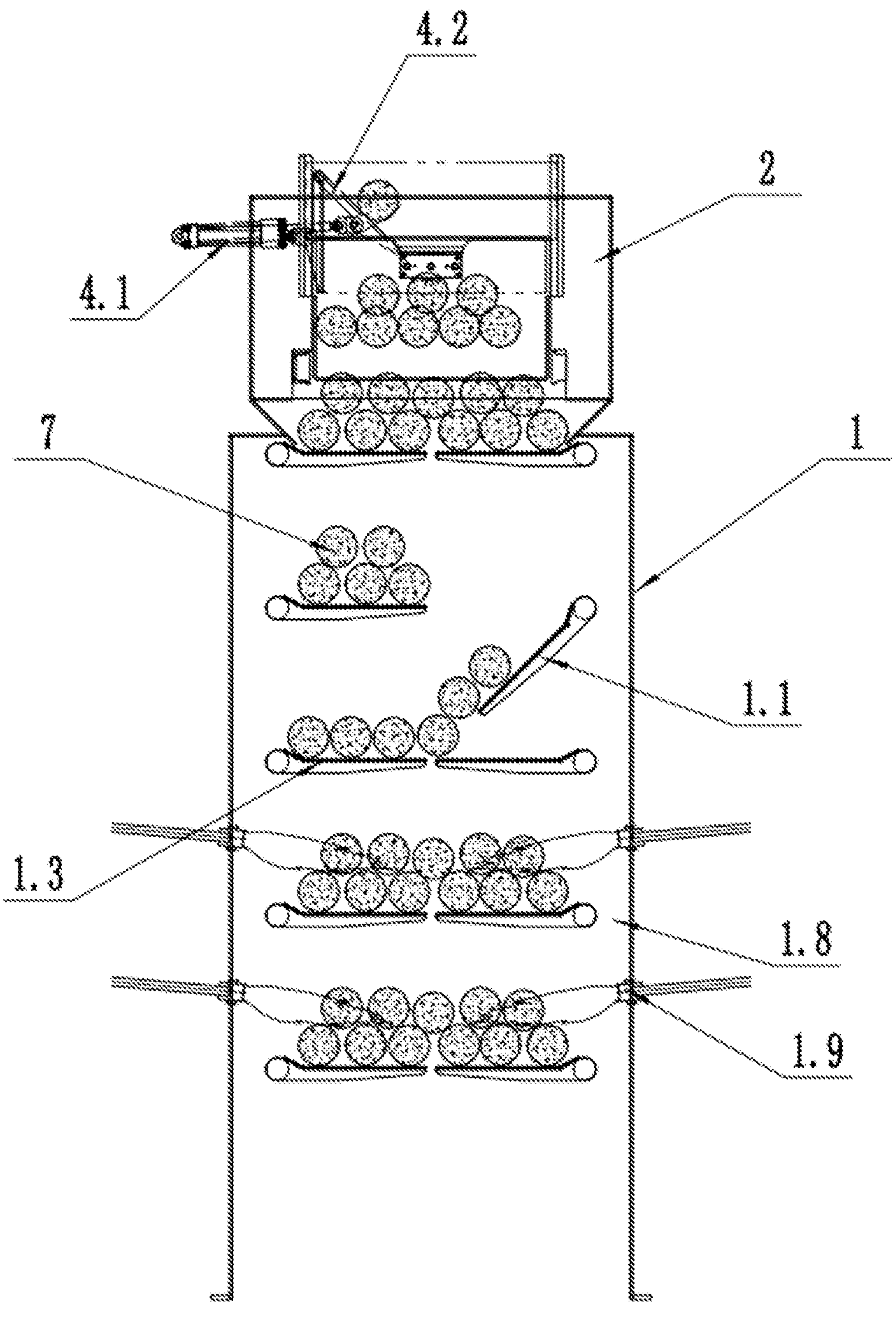
FIG. 2 is a first partial structural schematic diagram of the disclosure.
Figure 3:
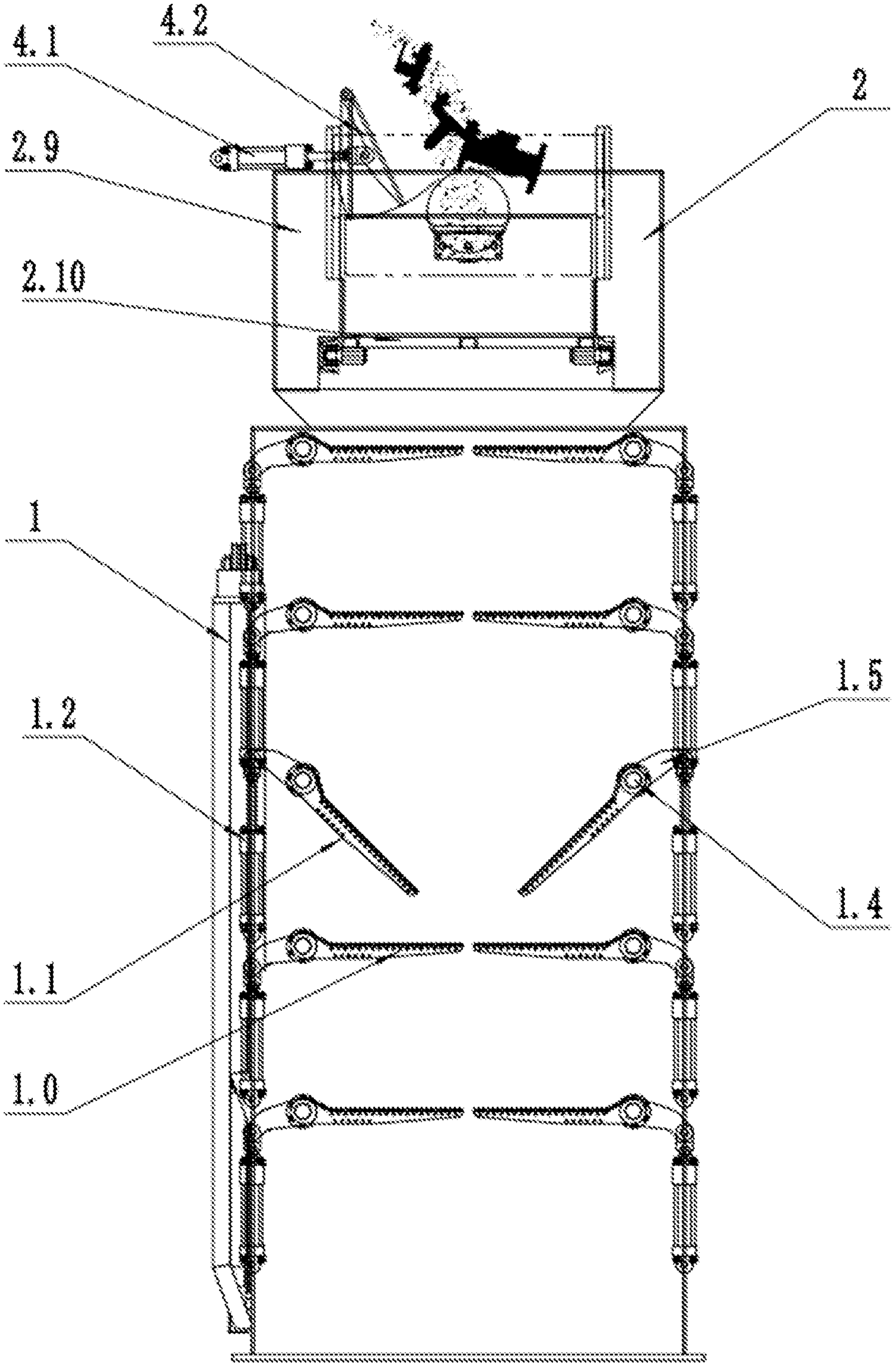
FIG. 3 is a second partial structural schematic diagram of the disclosure.
Figure 4:
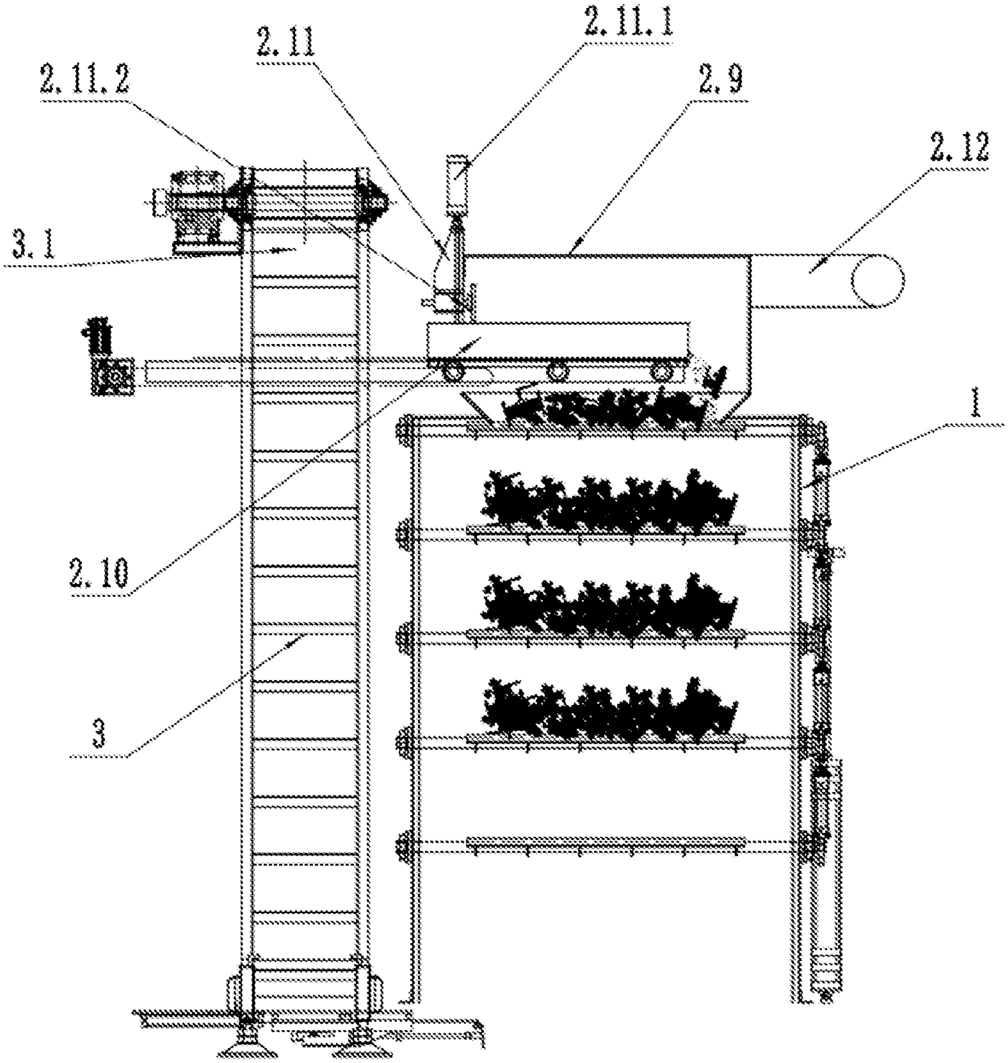
FIG. 4 is a second structural schematic diagram of the disclosure.

As illustrated in FIGS. 1 through 3, a high-temperature flue gas recovery apparatus for a melting furnace comprises a preheating chamber 1 and a feeding mechanism 2, a lower end of the preheating chamber 1 being in communication with a feeding port 6.1 of a melting furnace 6, the feeding mechanism 2 being disposed above the preheating chamber 1 to feed feedstock 7 into the preheating chamber 1, a plurality of layers of buffer mechanisms 1.0 layered in an upper-lower manner being provided in the preheating chamber 1, each layer of the buffer mechanism 1.0 comprising a buffer element 1.1 and a drive element 1.2, the drive element 1.2 driving the corresponding buffer element 1.1 to move such that the feedstock 7 on the buffer element 1.1 of an upper-layer buffer mechanism 1.0 falls onto the buffer element 1.1 of a lower-layer buffer mechanism 1.0, a gap 1.8 allowing a gas to pass through being provided between the buffer mechanisms 1.0 and an inner wall of the preheating chamber 1.

In the technical solution above, since the melting furnace 6 constantly generates high-temperature flue gas during the production process, the communication between a lower end of the preheating chamber 1 and the feeding port 6.1 of the melting furnace 6 allows the high-temperature flue gas in the melting furnace 6 to access the preheating chamber 1; the high-temperature gas accessing the preheating chamber 1 may pass through respective layers of the buffer mechanisms 1.0 from down to top via the gaps 1.8 to heat the feedstock 7 on respective layers of the buffer mechanisms 1.0; arrangement of a plurality of layers of buffer mechanisms 1.0 in the preheating chamber 1 may increase the stay time of the feedstock 7 in the preheating chamber 1 such that the feedstock 7 may be sufficiently heated by the high-temperature flue gas, which increases the waste heat recovery rate and thus increases energy utilization ratio of the production process; in addition, with the plurality of layers of buffer mechanisms 1.0, the present solution allows to feed the feedstock 7 to the melting furnace 6 in small quantity per time and in multiple times, which facilitates accurate control of the feed rate and amount of the feedstock 7.

Preferably, an inner cavity of the feeding mechanism 2 is in communication with an inner cavity of the preheating chamber 1, which allows the gas in the preheating chamber 1 to access the inner cavity of the feeding mechanism 1 to perform first preheating to the feedstock in the feeding mechanism 2, and allows the feedstock in the feeding mechanism 2 to access the preheating chamber 1, such that the feedstock is subjected to secondary preheating by the gas in the preheating chamber 1.

In the technical solution above, the high-temperature gas may perform first preheating and secondary preheating to the feedstock in the feeding mechanism 2 and the preheating chamber 1, respectively, which may increase the duration of heat exchange and give a better preheating effect, thereby sufficiently utilizing heat energy of the high-temperature flue gas.

Embodiment 2

As illustrated in FIGS. 1 to 2, based on the Embodiment 1, the buffer element 1.1 is of a plate structure and has a buffer state and a discharge state, the drive element 1.2 driving the buffer element 1.1 to switch between the buffer state and the discharge state. One end of the buffer element 1.1 is hinged to the preheating chamber 1, and the other end of the buffer element 1.1 is dangling; when the buffer element 1.1 is in the buffer state, the buffer element 1.1 is horizontally disposed, and when the buffer element 1.1 is in the discharge state, the buffer element 1.1 is inclinedly disposed.

In the technical solution above, switching of the buffer element 1.1 between the buffer state and the discharge state allows the feedstock 7 in the preheating chamber 1 to be delivered downward layer by layer till being fed into the melting furnace 6. When the buffer element 1.1 is in the buffer state, the feedstock 7 may be stacked above the buffer element 1.1; when the buffer element is in the discharge state, the feedstock 7 above the buffer element 1.1 may slide down onto the lower buffer element 1.1 along the inclinedly disposed buffer element 1.1.

Preferably, a plurality of through-holes 1.3 for the gas to pass through are provided on the buffer element 1.1.

In the technical solution above, the through holes 1.3 allow the high-temperature flue gas in the preheating chamber 1 to pass through to access above the buffer element 1.1, thereby preheating the feedstock 7 on the buffer element 1.1, which enhances the preheating effect.

Preferably, a gas fuel nozzle 1.9 is disposed above the preheating chamber 1, the gas fuel nozzle 1.9 facing toward the feedstock 7 on the buffer element. In the technical solution above, in a case that the flue gas temperature is insufficient, natural gas is applied to preheat the feedstock 7, which guarantees the feedstock melting speed in the melting furnace, thereby reducing energy consumption of the process and saving production costs. In the case of preheating the feedstock 7 using the natural gas, the natural gas may be injected via the gas fuel nozzle 1.9, and an ignitor built in the gas fuel nozzle 1.9 may ignite the natural gas injected into the preheating chamber 1, whereby the feedstock 7 is preheated using the heat generated from combustion of the natural gas.

Embodiment 3

As illustrated in FIG. 3, based on the Embodiment 1, a rotary shaft 1.4 is fixed at a position where the buffer element 1.1 is hinged to the preheating chamber 1, the rotary shaft 1.4 extending out of the preheating chamber 1 and being fixed with a connecting element 1.5, the drive element 1.2 being a linear drive, one end of the drive element 1.2 being hinged to the preheating chamber 1, the other end of the preheating chamber 1 being hinged to the connecting element 1.5.

In the technical solution above, extension and retraction of the drive element 1.2 may bring the connecting element 1.5 to rotate about an axis of the rotary shaft 1.4, thereby further bringing the buffer element 1.1 to rotate about the axis of the rotary shaft 1.4 such that the buffer element 1.1 may switch between the buffer state and the discharge state.

Preferably, each layer of the buffer mechanism 1.0 comprises two buffer elements 1.1 and two drive elements 1.2 each drive element 1.2 driving the corresponding buffer element 1.1, dangling ends of the two buffer elements 1.1 being oppositely disposed.

In the technical solution above, separate provision of the two buffer elements 1.1 allows their separate control, such that the feedstock 7 on each layer may be further fed in twice; in this way, the feeding rate and amount of the feedstock 7 may be controlled more accurately.

Embodiment 4

As illustrated in FIGS. 1 to 4, based on the Embodiment 3, the feeding mechanism 2 comprises a flue-gas collection hood 2.9, a transverse movement assembly 2.10, and a pusher assembly 2.11 disposed above the transverse movement assembly 2.10, a lower end of the flue-gas collection hood 2.9 being in communication with the preheating chamber 1, an exhaust pipe 2.12 being disposed on the flue-gas collection hood 2.9, the transverse movement assembly 2.10 being transversely movable relative to the flue-gas collection hood 2.9, one end of the transverse movement assembly 2.10 extending into the flue-gas collection hood 2.9, the pusher assembly 2.11 comprising a lift drive 2.11.1 and a lift plate

2.11.2, the lift drive 2.11.1 being mounted on the preheating chamber 1, and the lift drive 2.11.1 being configured to drive the lift plate 2.11.2 to lift.

In the technical solution above, the transverse movement assembly 2.10 delivers the feedstock 7 outside the flue-gas collection hood 2.9 into the flue-gas collection hood 2.9, and then the lift drive 2.11.1 in the pusher assembly 2.11 drives the lift plate 2.11.2 to move downward such that the lift plate 2.11.2 blocks the feedstock 7 on the transverse movement assembly 2.10; afterwards, the transverse movement assembly 2.10 moves backward such that the feedstock 7 on the transverse movement assembly 2.10 is blocked by the lift plate 2.11.2 and falls into the preheating chamber 1 below the flue-gas collection hood 2.9. The transverse movement assembly 2.10 comprises a linear drive mechanism and a transversely moving rack; the feedstock 7 may be disposed on the transversely moving rack, and the linear drive mechanism drives the transversely moving rack to move transversely such that the transversely moving rack may extend into or out of the flue-gas collection hood 2.9. The exhaust pipe 2.12 is in communication with an external extraction device such that the high-temperature flue gas having been subjected to heat exchange in the flue-gas collection hood 2.9 may be exhausted by the external extraction device.

Preferably, the high-temperature flue gas recovery apparatus for a melting furnace further comprises a lifting chain scrapper conveyor 3 configured to lift the feedstock 7 to the feeding mechanism 2, a delivery port 3.1 of the lifting chain scrapper conveyer being aligned to the feedstock inlet port 2.4 of the feeding mechanism 2.

Preferably, a spreading linear drive 4.1 and a spreading plate 4.2 are provided above the feeding mechanism 2, one end of the spreading plate 4.2 being hinged to the feeding mechanism 2, one end of the spreading linear drive 4.1 being hinged to the feeding mechanism 2, the other end of the spreading linear drive 4.1 being hinged to the spreading plate 4.2 such that the spreading plate 4.2 is driven by the spreading linear drive 4.1 to sway reciprocally. When the spreading linear drive 4.1 extends out or is retracted, one end of the spreading linear drive 4.1, which is rotatably connected to the feeding mechanism 2, rotates relative to the feeding mechanism 2, and the other end of the spreading linear drive 4.1 drives the spreading plate 4.2 to sway reciprocally relative to the feeding mechanism 2.

Embodiment 5

Figure 5:
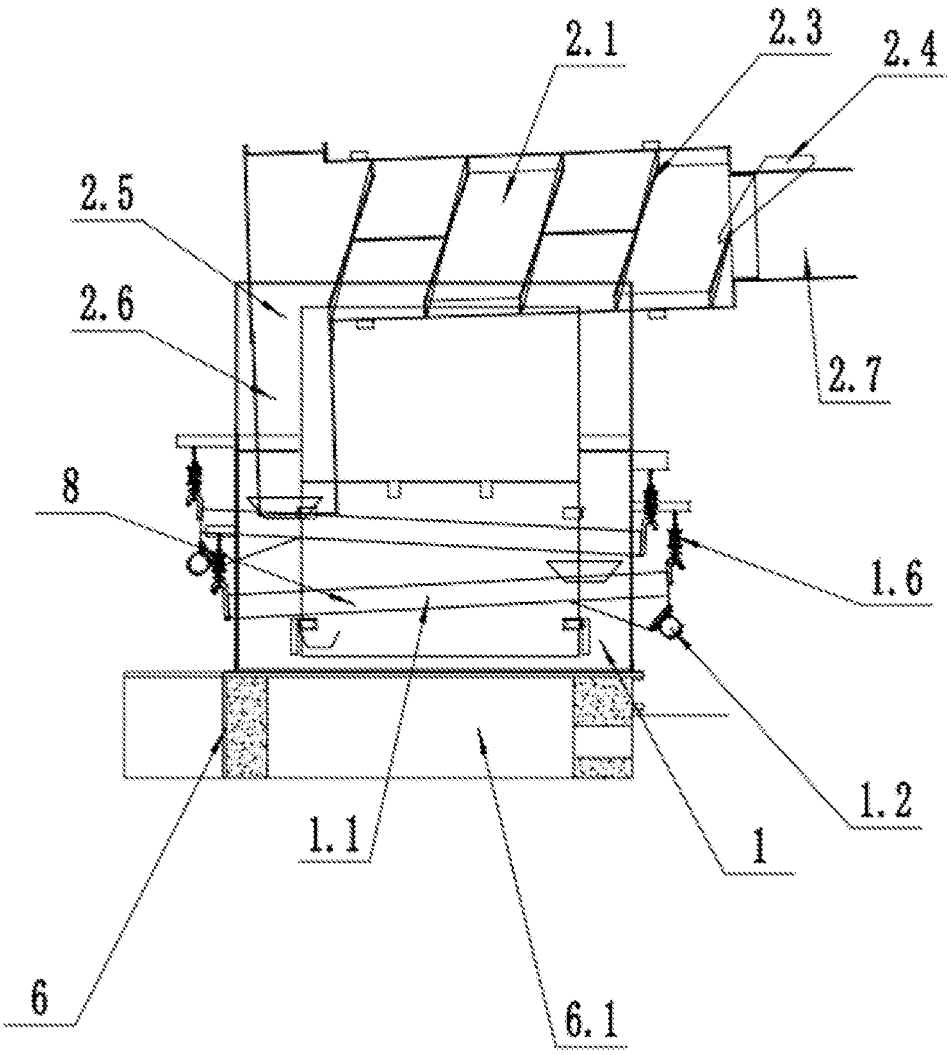
FIG. 5 is a structural schematic diagram of Embodiment 5 and Embodiment 7.
Figure 6:
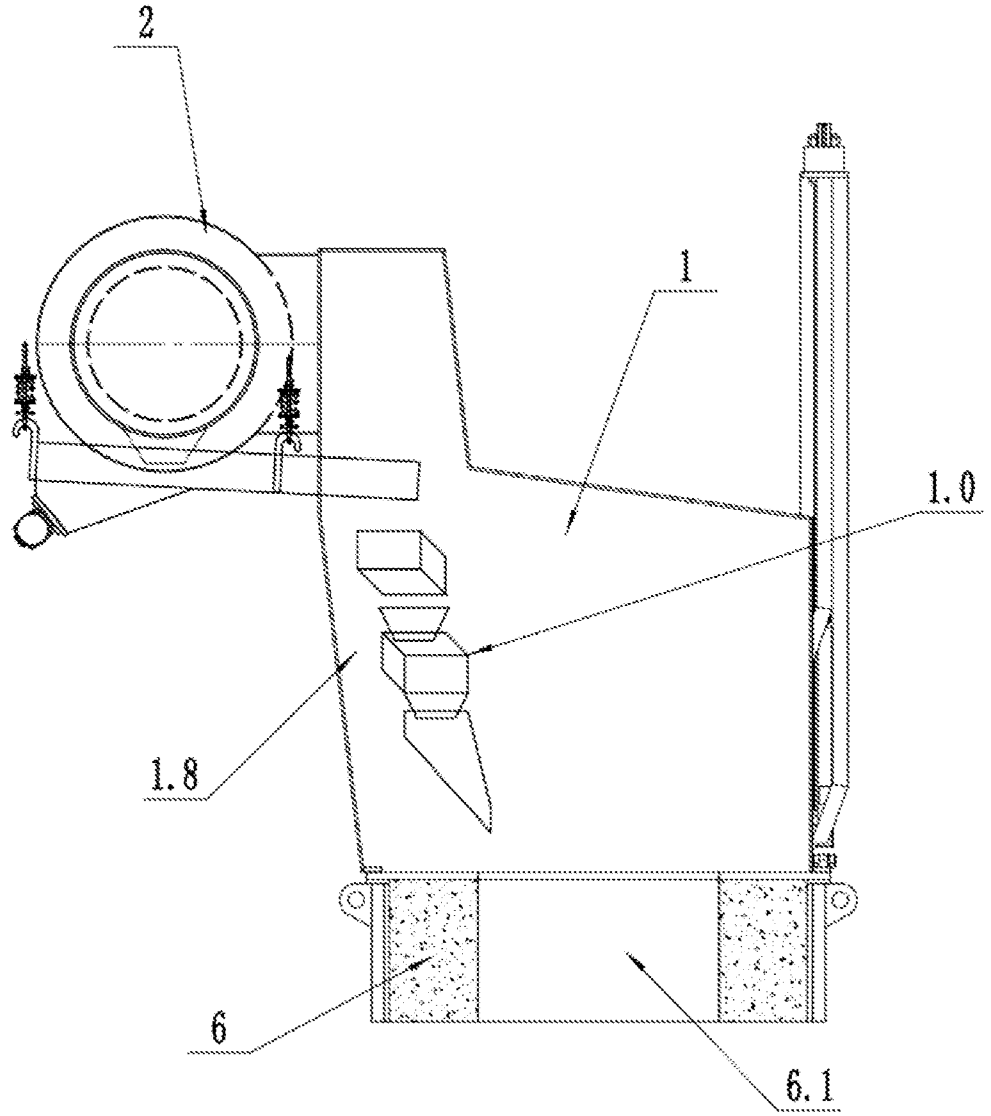
FIG. 6 is a side view of a high-temperature flue gas recovery apparatus in Embodiment 5.

As illustrated in FIGS. 5 and 6, based on the Embodiment 1, the buffer element 1.1 is connected to the preheating chamber 1 via an elastic member 1.6. The drive element 1.2 is a vibrator and the buffer element 1.1 is inclinedly disposed. In two neighboring buffer elements 1.1, a lower end of the upper buffer element 1.1 is aligned to a higher end of the lower buffer element 1.1, such that when corresponding vibrator brings the upper buffer element 1.1 to vibrate, the feedstock 7 on the upper buffer element 1.1 falls onto the lower buffer element 1.1. One end of the buffer element 1.1 extends out of the melting furnace, and the vibrator is disposed outside the melting furnace.

In the technical solution above, the buffer element 1.1 is brought to vibrate by the vibrator such that the feedstock on the buffer element 1.1 moves slowly downward; the feedstock may be spread on the buffer element 1.1 to exchange heat sufficiently, and then falls onto the lower-layer buffer element 1.1 under the action of vibration, finally falling into the melting furnace. One end of the buffer element 1.1 extends out of the melting furnace 1, and the vibrator is disposed outside the melting furnace 1; in this way, the vibrator may avoid the high-temperature environment in the melting furnace, which increases service life of the vibrator.

Embodiment 6

Figure 7:
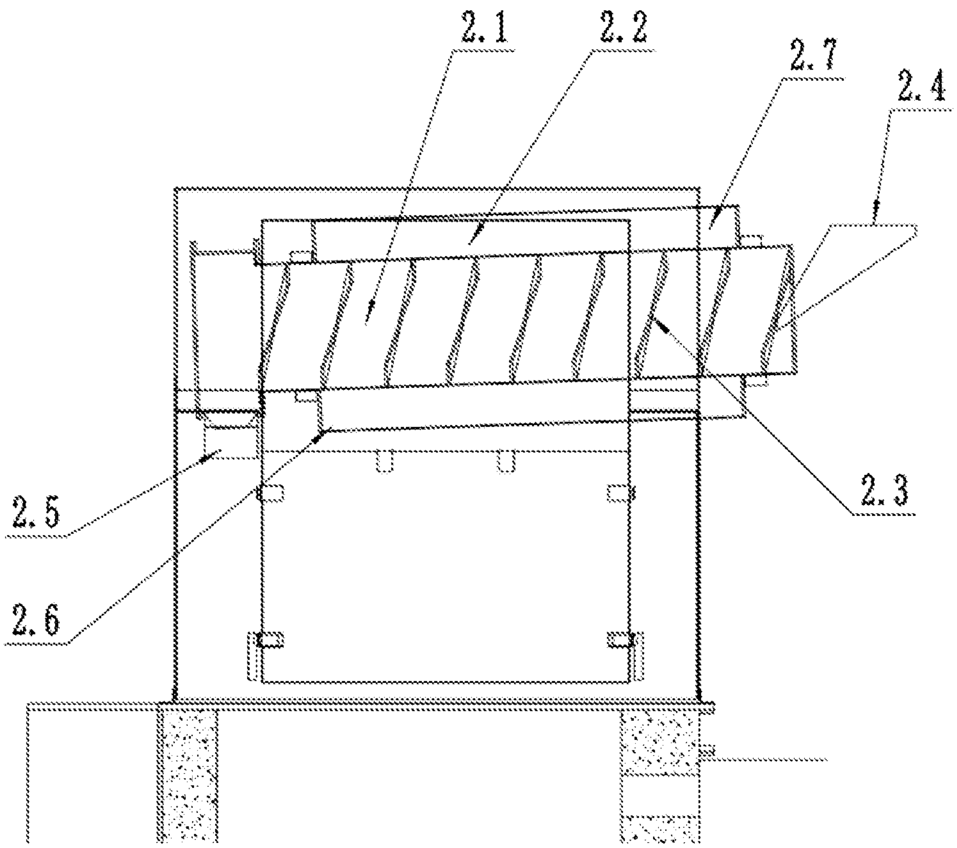
FIG. 7 is a structural schematic diagram of Embodiment 5.

As illustrated in FIGS. 5 to 7, based on the Embodiment 5, the feeding mechanism 2 comprises a rotary cylinder 2.1 and a gas cylinder 2.2, the gas cylinder 2.2 being sleeved outside the rotary cylinder 2.1, a screw pusher plate 2.3 being provided on an inner wall of the rotary cylinder 2.1, one end of the rotary cylinder 2.1 being provided with a feedstock inlet port 2.4, the other end of the rotary cylinder 2.1 being provided with a feedstock outlet port 2.5, one end of the gas cylinder 2.2 being provided with a gas inlet 2.6, the other end of the gas cylinder 2.2 being provided with a gas outlet 2.7, the gas inlet 2.6 being in communication with the preheating chamber 1 via a pipe; with this design, the high-temperature flue gas in the preheating chamber 1 is directed into the gas inlet 2.6 via the pipe, such that the high-temperature flue gas is subjected to heat exchange in the gas cylinder 2.2; since the feedstock outlet port 2.5 is disposed above the buffer element 1.1 and the gas outlet 2.7 is in communication with the external extraction device, the high-temperature flue gas having been subjected to heat exchange is exhausted by the external extraction device via the gas outlet 2.7. The rotary cylinder 2.1 is driven by a rotary drive to rotate.

In the technical solution above, the feedstock enters the rotary cylinder 2.1 via the feedstock inlet port 2.4; under the action of the screw pusher plate 2.3, the feedstock 7 is delivered towards the feedstock outlet port 2.5; the high-temperature flue gas in the preheating chamber 1 enters the gas cylinder 2.2 via the gas inlet 2.6 to heat the inner wall of the gas cylinder 2.2; the gas cylinder 2.2 transfers heat to the rotary cylinder 2.1 so as to heat the feedstock 7 in the rotary cylinder 2.1; the cooled flue gas is discharged out of the gas cylinder 2.2 via the gas outlet 2.7; the feedstock 7 in the rotary cylinder 2.1, after being heated, enters the preheating chamber 1 via the feedstock outlet port 2.5, where it is further heated.

Embodiment 7

As illustrated in FIG. 5, based on the Embodiment 5, the feeding mechanism 2 comprises a rotary cylinder 2.1, a screw pusher plate 2.3 being provided on an inner wall of the rotary cylinder 2.1, one end of the rotary cylinder 2.1 being provided with a feedstock inlet port 2.4 and a gas outlet 2.7, the other end of the rotary cylinder 2.1 being provided with a feedstock outlet port 2.5, the feedstock outlet port 2.5 being disposed above the buffer element 1.1, and the gas outlet 2.7 being in communication with an external extraction device.

In the technical solution above, the feedstock 7 enters the rotary cylinder 2.1 via the feedstock inlet port 2.4, and under the action of the screw pusher plate 2.3, the feedstock 7 moves towards the feedstock outlet port 2.5; the high-temperature flue gas in the preheating chamber 1 may enter the rotary cylinder 2.1 via the feedstock outlet port 2.5 to heat the feedstock 7 in the rotary cylinder 2.1; the cooled flue gas is extracted by the external extraction device via the gas outlet 2.7; the feedstock 7 in the rotary cylinder 2.1, after being heated by the high-temperature flue gas, enters the preheating chamber 1 via the feedstock outlet port 2.5, where it is further heated. In this solution, the high-temperature flue gas directly contacts with the feedstock in the rotary cylinder 2.1, which offers a better heat exchange effect. The rotary cylinder 2.1 is driven by a rotary drive to rotate.

Embodiment 8

Figure 8:
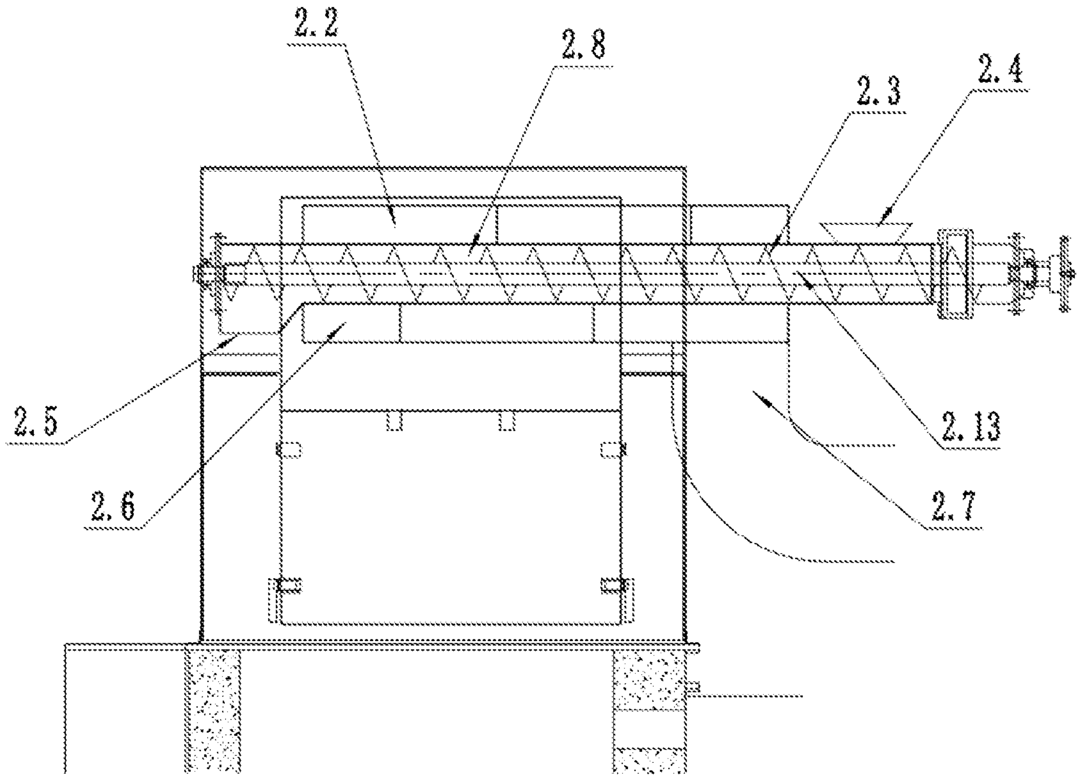
FIG. 8 is a structural schematic diagram of Embodiment 8.
Figure 9:
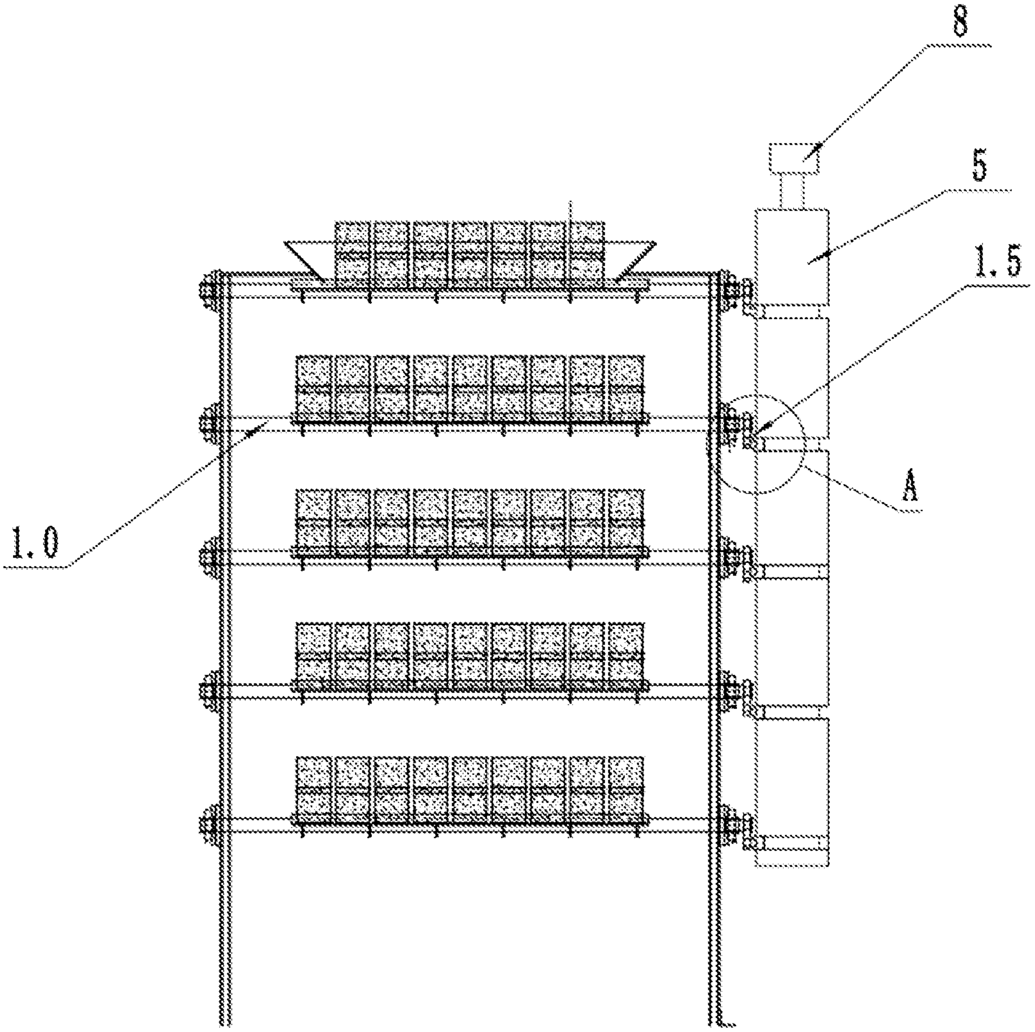
FIG. 9 is a first structural schematic diagram of Embodiment 9.

As illustrated in FIG. 8, based on the Embodiment 5, the feeding mechanism 2 comprises a feed cylinder 2.8 and a gas cylinder 2.2, the gas cylinder 2.2 being sleeved outside the feed cylinder 2.8, a feeding shaft 2.13 being provided in the feed cylinder 2.8, a screw pusher plate 2.3 being provided on a sidewall of the feeding shaft 2.13, one end of the feed cylinder 2.8 being provided with a feedstock inlet port 2.4, the other end of the feed cylinder 2.8 being provided with a feedstock outlet port 2.5, one end of the gas cylinder 2.2 being provided with a gas inlet 2.6, the other end of the gas cylinder 2.2 being provided with a gas outlet 2.7, the gas inlet 2.6 being in communication with the preheating chamber 1, the feedstock outlet port 2.5 being disposed above the buffer element 1.1, and the gas outlet 2.7 being in communication with an external extraction device.

In the technical solution above, the feedstock 7 enters the feed cylinder 2.8 via the feedstock inlet port 2.4; the feeding shaft 2.13 drives the screw pusher plate 2.3 to rotate; under the action of the screw pusher plate 2.3, the feedstock 7 moves towards the feedstock outlet port 2.5; the high-temperature flue gas in the preheating chamber 1 enters the gas cylinder 2.2 via the gas inlet 2.6 to heat the inner wall of the gas cylinder 2.2; the gas cylinder 2.2 transfers heat to the feed cylinder 2.8 to heat the feedstock 7 in the feed cylinder 2.8; the cooled flue gas is discharged out of the gas cylinder 2.2 via the gas outlet 2.7; the feedstock 7 in the feed cylinder 2.8, after being heated, enters the preheating chamber 1 via the feedstock outlet port 2.5, where it is further heated. In this solution, the feed cylinder 2.8 and the gas cylinder 2.2 do not rotate relative to each other, such that a sealing structure is more easily arranged, and a better sealing effect is achieved; accordingly, the high-temperature flue gas does not easily escape from a joint between the feed cylinder 2.8 and the gas cylinder 2.2. The rotary cylinder 2.1 is driven by a rotary drive to rotate.

Embodiment 9

As illustrated in FIG. 2, FIG. 9, FIG. 10, FIG. 11, and FIG. 12, based on the Embodiment 2, a rotary shaft 1.4 is fixed at a position where the buffer element 1.1 is hinged to the preheating chamber 1, the rotary shaft 1.4 extending out of the preheating chamber 1 and being fixed with a connecting element 1.5, the drive element 1.2 comprising a rotary drive 8 and a drive shaft 5 which are mounted on the preheating chamber 1, the rotary drive 8 driving the drive shaft 5 to rotate, a plurality of annular grooves 5.1 arranged at intervals along a vertical direction being provided on a sidewall of the drive shaft 5, each of the annular grooves 5.1 comprising a horizontal segment 5.1.1 and a crooked segment 5.1.2 which are in communication with each other, the crooked segments 5.1.2 of two upper-lower neighboring annular grooves 5.1 being misaligned, one end of the connecting element 1.5 extending into the annular groove 5.1 and being slidingly disposed relative to the annular groove 5.1; when one end of the connecting element 1.5 is located at the horizontal segment 5.1.1, the buffer element 1.1 is in a buffer state; when one end of the connecting element 1.5 is located at the crooked segment 5.1.2, the corresponding buffer element 1.1 is in a discharge state; and the positions where a plurality of connecting elements 1.5 are connected to the same drive shaft 5 are located on a same vertical line.

In the technical solution above, the buffer elements 1.1 in the plurality of layers of buffer mechanisms 1.0 share a same drive element 1.2; or, the drive elements 1.2 in the plurality of layers of buffer mechanisms 1.0 are combined into one integral member which can simultaneously drive a plurality of buffer elements 1.1 to move. The drive shaft 5 is fixed to the preheating chamber 1 in the axial direction of the drive shaft 5, such that the drive shaft 5 can only rotate relative to the preheating chamber 1, the drive shaft 5 being driven to rotate by the rotary drive 8; during the rotating process of the drive shaft 5, the annular groove 5.1 rotates along therewith, and since one end of the connecting element 1.5 extends into the annular groove 5.1 and is slidingly disposed relative to the annular groove 5.1, the end of the connecting element 1.5 extending into the annular groove 5.1 switches between the horizontal segment 5.1.1 and the crooked segment 5.1.2; when the end of the connecting element 1.5 extending into the annular groove 5.1 is located at the horizontal segment 5.1.1, the buffer element 1.1 is in the buffer state; and when the end of the connecting element 1.5 enters the crooked segment 5.1.2 from the horizontal segment 5.1.1, the connecting element 1.5 moves a certain distance vertically, bringing the buffer element 1.1 to rotate by a certain angle about the rotary shaft 1.4, whereby the buffer element 1.1 switches from the buffer state to the discharge state; with continuous rotation of the drive shaft 5, the end of the connecting element 1.5 further enters the horizontal segment 5.1.1 from the crooked segment 5.1.2, whereby the buffer element 1.1 switches back to the buffer state from the discharge state. Since the crooked segments 5.1.2 of the two neighboring annular grooves 5.1 are misaligned, in the two neighboring annular grooves 5.1, when one end of one connecting element 1.5 thereof is disposed at the crooked segment 5.1.2, one end of the other connecting element 1.5 is surely disposed at the horizontal segment 5.1.1; in this way, the two buffer elements 1.1 may be disposed in two different states at the same time, which may avoid a circumstance that the upper and lower buffer elements 1.1 are simultaneously disposed in the discharge state and the feedstock 7 directly crosses over a plurality of buffer mechanisms 1.0 without staying, thereby ensuring that the feedstock 7 has sufficient time to be preheated. Moreover, in the solution above, the plurality of buffer elements 1.1 may be controlled only via one rotary drive 8 and one drive shaft 5, which may save costs of the drive elements 1.2; meanwhile, after the apparatus is completely assembled, respective buffer elements 1.1 may switch between the buffer state and the discharge state according to a preset time sequence only by driving the drive shaft 5 to rotate continuously, without a need to set a complex control program as well as control elements, resulting in a lower control cost and a more reliable control. In a case where the feedstock 7 is fully stacked on the connecting element 1.5 and one end of the connecting element 1.5 is disposed at the horizontal segment 5.1.1, the acting force direction of the connecting element 1.5 against the drive shaft 5 is identical to the axial direction of the drive shaft 5, such that the drive shaft 5 is subjected to no acting force in the horizontal direction, whereby rotation of the drive shaft 5 is almost unaffected; therefore, the rotary drive 8 may adopt a smaller torque, which reduces the cost of the rotary drive 8; when the rotary drive 8 stops rotation, the connecting element 1.5 is locked, such that the buffer element 1.1 is maintained in the buffer state or the discharge state, offering a higher stability for the buffer element 1.1 to switch between states; meanwhile, it eliminates an extra locking mechanism, further reducing the costs of parts.

Preferably, any two crooked segments 5.1.2 of a plurality of annular grooves 5.1 are misaligned. This technical solution may ensure that only one buffer element 1.1 is in a discharge state at the same time.

Preferably, a contact shaft 1.7 is provided on the connecting element 1.5, the contact shaft 1.7 being rotatably connected to the connecting element 1.5, one end of the contact shaft 1.7 extending into the annular groove 5.1, the connecting element 1.5 being connected to the annular groove 5.1 via the contact shaft 1.7. The contact shaft 1.7 may convert the sliding friction between the connecting element 1.5 and the sidewall of the annular groove 5.1 to rolling friction.

It is understood that, in one embodiment, when the drive shaft 5 is rotating, in any two connecting elements 1.5, the lower connecting element 1.5 passes through the crooked segment 5.1.2 earlier than the upper connecting element 1.5. In this technical solution, when the drive shaft 5 is rotating, the buffer elements 1.1 may switch from the buffer state to the discharge state sequentially from down to top.

It is understood that, in another embodiment, when the drive shaft 5 is rotating, in any two connecting elements 1.5, the upper connecting element 1.5 passes through the crooked segment 5.1.2 earlier than the lower connecting element 1.5. In this technical solution, when the drive shaft 5 is rotating, the respective buffer elements 1.1 may switch from the buffer state to the discharge state sequentially from top to down.

It is understood that, in one embodiment, the connecting element and the buffer element are disposed at the same side of the rotary shaft, such that when the connecting element 1.5 turns downward, the buffer element also turns downward, where the crooked segment is bent downward.

Figure 10:
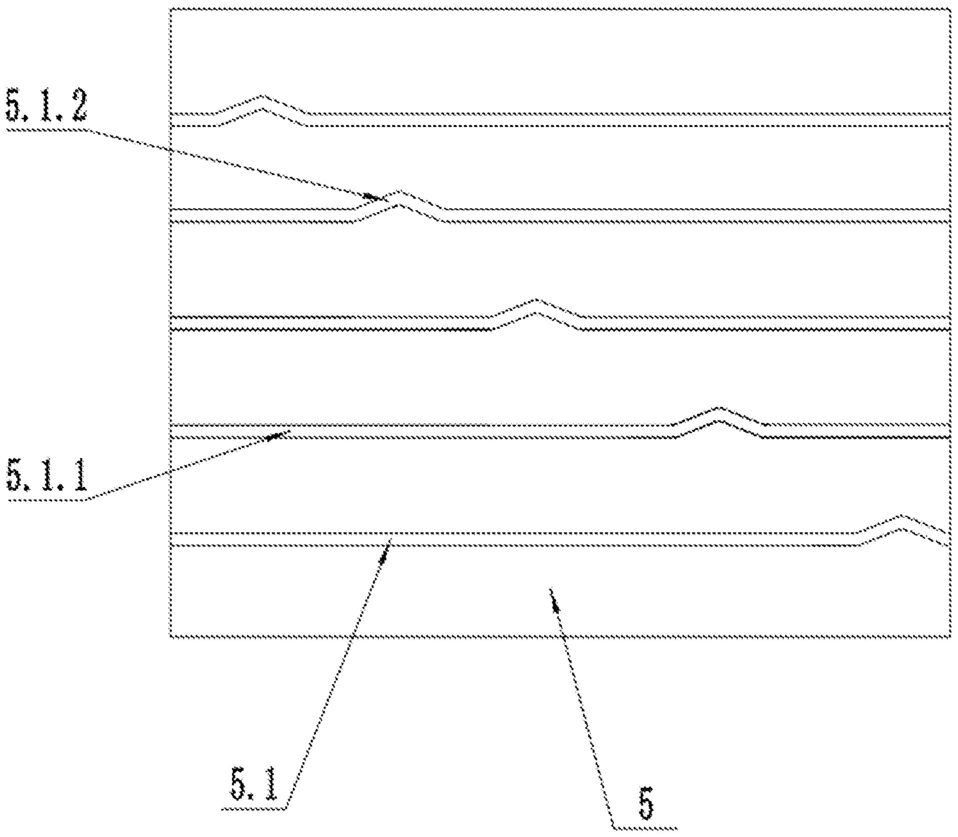
FIG. 10 is an expanded side view of a drive shaft in Embodiment 9.
Figure 11:
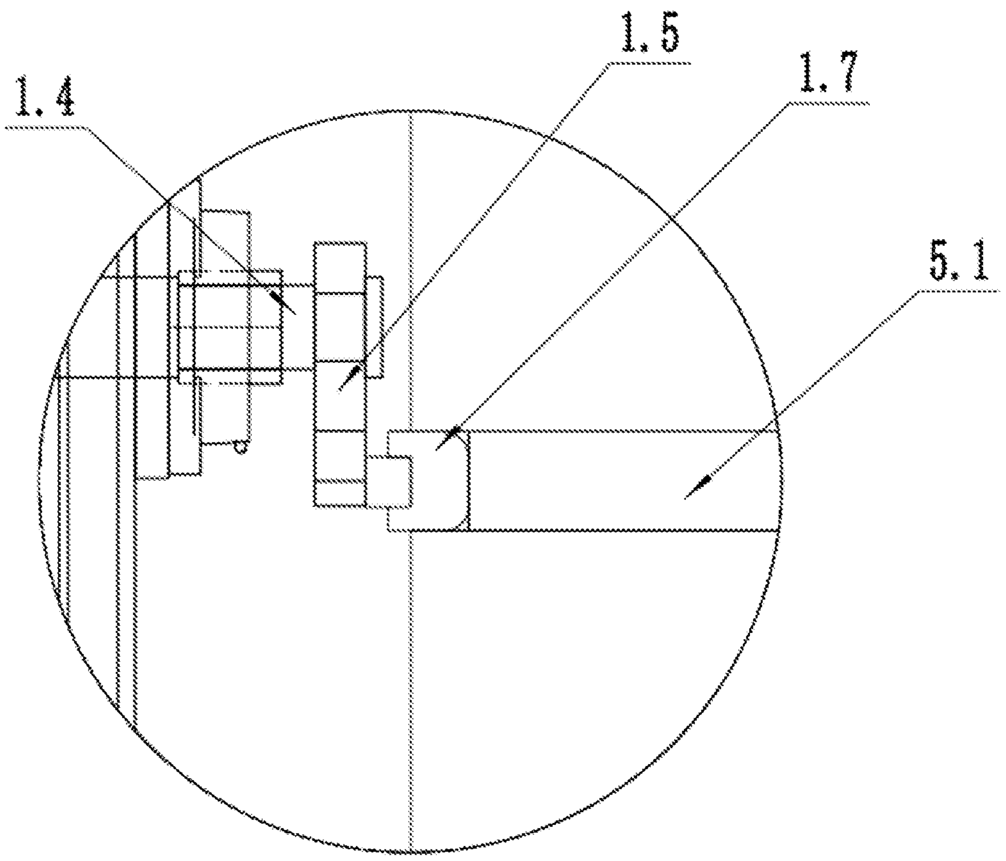
FIG. 11 is a partially enlarged view of part A in FIG. 9.
Figure 12:
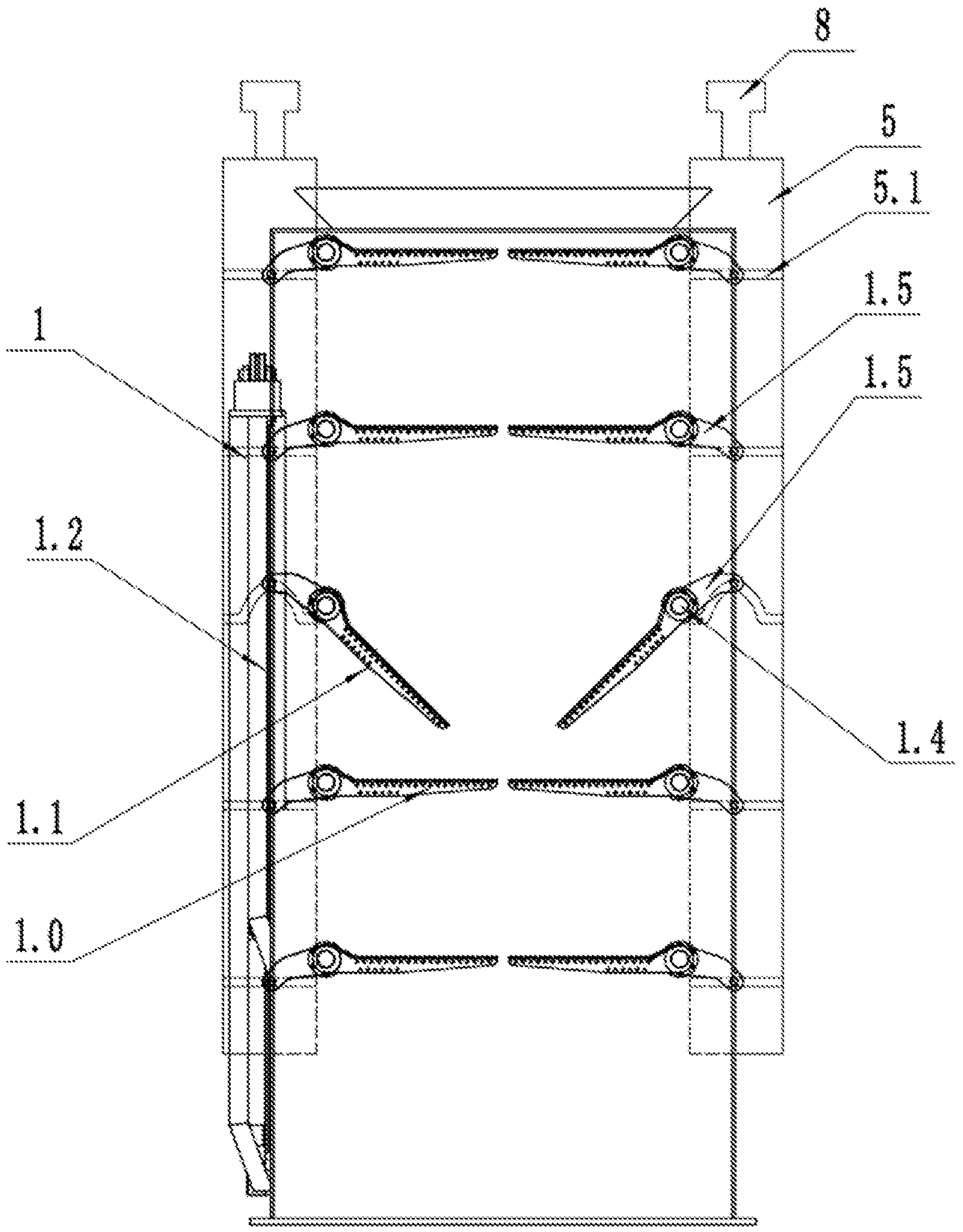
FIG. 12 is a second structural schematic diagram of Embodiment 9.

It is understood that, in another embodiment, as illustrated in FIG. 10, the connecting element 1.5 and the buffer element 1.1 are disposed at two opposite sides of the rotary shaft 1.4, such that when the connecting element 1.5 turns upward, the buffer element 1.1 turns downward, where the crooked segment 5.1.2 is bent upward.

Embodiment 10

Figure 13:
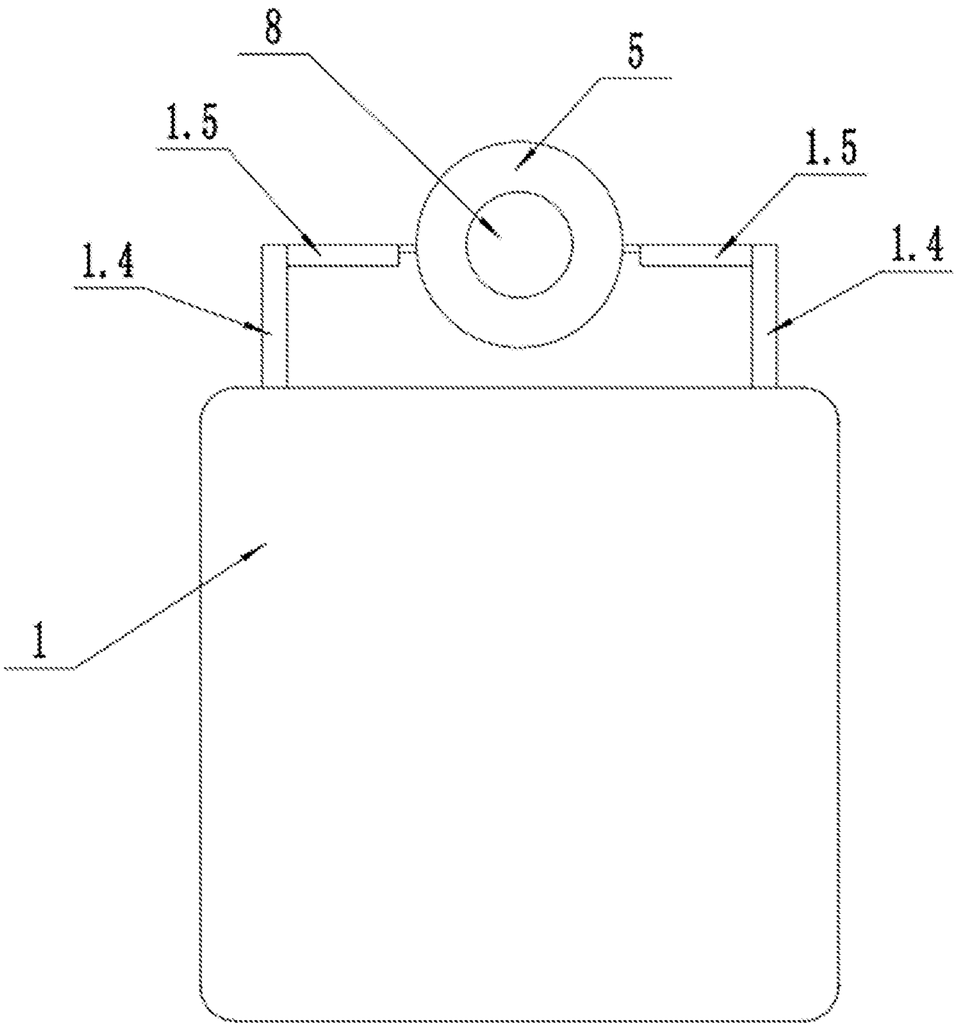
FIG. 13 is a structural schematic diagram of Embodiment 10.

As illustrated in FIG. 13, based on the Embodiment 9, each layer of the buffer mechanism 1.0 comprises two buffer elements 1.1, the two buffer elements 1.1 in the same layer of buffer mechanism 1.0 being oppositely disposed, end portions of the two connecting elements 1.5 in the same layer of buffer mechanism 1.0 being disposed in the same annular groove 5.1, the two connecting elements 1.5 being disposed at two opposite sides of the drive shaft 5 such that at most one of the two buffer elements 1.1 in the same layer of buffer mechanism 1.0 is in the discharge state. Furthermore, among all buffer elements 1.1, at most one is disposed in the discharge state at the same time.

In the technical solution, the two buffer elements 1.1 in the same layer of buffer mechanism 1.0 allow to charge the feedstock 7 in each layer in twice, whereby the feed rate and amount of the feedstock 7 may be more accurately controlled. Moreover, the states of all buffer elements 1.1 are controlled by one drive shaft 5, which allows the respective buffer elements 1.1 to switch between the buffer state and the discharge state sequentially according to a preset sequence, such that among all buffer elements 1.1, at most one is disposed in the discharge state at the same time. This may prevent the feedstock from directly crossing over the buffer element 1.1.

It is understood that, in another embodiment, the plurality of connecting elements disposed in an upper-lower manner at the same side are driven by the same drive shaft, and two drive shafts drive the connecting elements at two sides independently, where the two drive shafts are driven to rotate by their corresponding rotary drives.

We claim:

1. A high-temperature flue gas recovery apparatus for a melting furnace, comprising: a preheating chamber and a feeding mechanism, a lower end of the preheating chamber being in communication with a feeding port of the melting furnace, the feeding mechanism being disposed above the preheating chamber to deliver feedstock into the preheating chamber, a plurality of layers of buffer mechanisms layered in an upper-lower manner being provided in the preheating chamber, each layer of the buffer mechanism comprising a buffer element and a drive element, the drive element driving the corresponding buffer element to move such that the feedstock on the buffer element of an upper-layer buffer mechanism falls onto the buffer element of a lower-layer buffer mechanism, a gap allowing for a gas to pass through being provided between the buffer mechanisms and an inner wall of the preheating chamber, wherein the feeding mechanism comprises a flue-gas collection hood, a transverse movement assembly, and a pusher assembly disposed above the transverse movement assembly, a lower end of the flue-gas collection hood being in communication with the preheating chamber, an exhaust pipe being provided on the flue-gas collection hood, the transverse movement assembly being transversely movable relative to the flue-gas collection hood, one end of the transverse movement assembly extending into the flue-gas collection hood, the pusher assembly comprising a lift drive and a lift plate, the lift drive being mounted on the preheating chamber, and the lift drive driving the lift plate to lift.

2. The high-temperature flue gas recovery apparatus for a melting furnace according to claim 1, wherein the buffer element has a buffer state and a discharge state, the drive element driving the buffer element to switch between the buffer state and the discharge state.

3. The high-temperature flue gas recovery apparatus for a melting furnace according to claim 2, wherein one end of the buffer element is hinged to the preheating chamber, and the other end of the buffer element is dangling; in a case where the buffer element is in the buffer state, the buffer element is horizontally disposed; in a case where the buffer element is in a discharge state, the buffer element is inclinedly disposed.

4. The high-temperature flue gas recovery apparatus for a melting furnace according to claim 3, wherein each layer of the buffer mechanism comprises two buffer elements and two drive elements, each drive element driving the corresponding buffer element, the two buffer elements being oppositely disposed.

5. The high-temperature flue gas recovery apparatus for a melting furnace according to claim 1, wherein the drive element is a vibrator, the buffer element being inclinedly disposed; in two neighboring buffer elements, a lower end of the upper buffer element is aligned to a higher end of the lower buffer element such that when the vibrator drives the upper buffer element to vibrate, the feedstock on the upper buffer element falls onto the lower buffer element; the buffer element is connected to the preheating chamber via an elastic element.

6. The high-temperature flue gas recovery apparatus for a melting furnace according to claim 1, wherein an inner cavity of the feeding mechanism is in communication with an inner cavity of the preheating chamber, allowing for the gas in the preheating chamber to access the inner cavity of the feeding mechanism to perform first preheating to the feedstock in the feeding mechanism, and allowing for the feedstock in the feeding mechanism to access the preheating chamber such that the gas in the preheating chamber performs secondary preheating to the feedstock.

7. The high-temperature flue gas recovery apparatus for a melting furnace according to claim 3, wherein a rotary shaft is fixed at a position where the buffer element is hinged to the preheating chamber, the rotary shaft extending out the preheating chamber and being fixed with a connecting element; the drive element comprises a rotary drive and a drive shaft which are mounted on the preheating chamber, the rotary drive driving the drive shaft to rotate; a plurality of annular grooves arranged at intervals along a vertical direction are provided on a sidewall of the drive shaft, each annular groove comprising a horizontal segment and a crooked segment which are in communication with each other, the crooked segments of two upper-lower neighboring annular grooves being misaligned; one end of the connecting element extends into the corresponding annular groove and is slidingly disposed relative to the annular groove; when one end of the connecting element is located at the horizontal segment, the buffer element is disposed in the buffer state, and when the end of the connecting element is located at the crooked segment, the buffer element is disposed in a discharge state; and positions of a plurality of connecting elements connected to a same drive shaft are located on a same vertical line.

8. The high-temperature flue gas recovery apparatus for a melting furnace according to claim 7, wherein in the plurality of annular grooves, any two crooked segments are misaligned.

9. The high-temperature flue gas recovery apparatus for a melting furnace according to claim 7, wherein when the drive shaft is rotating, in any two connecting elements, the lower connecting element passes through the crooked segment earlier than the upper connecting element; or, when the drive shaft is rotating, in any two connecting elements, the upper connecting element passes through the crooked segment earlier than the lower connecting element.

10. The high-temperature flue gas recovery apparatus for a melting furnace according to claim 7, wherein a contact shaft is provided on the connecting element, the contact shaft being rotatably connected to the connecting element, one end of the contact shaft extending into the annular groove, the connecting element being connected to the annular groove via the contact shaft.

11. The high-temperature flue gas recovery apparatus for a melting furnace according to claim 7, wherein each layer of buffer mechanism comprises two buffer elements, the two buffer elements in a same layer of buffer mechanism being oppositely disposed, end portions of the two connecting elements in the same layer of buffer mechanism being disposed in a same annular groove, the two connecting elements being disposed at opposite sides of the drive shaft such that at most one of the two buffer elements in the same layer of buffer mechanism is in the discharge state, and at most one of all buffer elements is in the discharge state at the same time.

* * * * *